United States Patent [19]
Hu et al.

[11] Patent Number: 5,738,699
[45] Date of Patent: Apr. 14, 1998

[54] APPARATUS FOR TREATING PARTICLES

[75] Inventors: Chu Lin Hu, Hsinchu Hsien; Chia Hsing Huang, Tainan; Ching Wen Deng; Kuo Cheng Chang, both of Hsinchu Hsien, all of Taiwan

[73] Assignee: United Microelectronics Corporation, Taipei, Taiwan

[21] Appl. No.: 706,730

[22] Filed: Sep. 6, 1996

[30] Foreign Application Priority Data

Jul. 29, 1996 [TW] Taiwan ................... 85109209

[51] Int. Cl.⁶ .................... B01D 5/00; B01D 47/06
[52] U.S. Cl. ................. 55/242; 55/267; 55/431; 95/149
[58] Field of Search ................. 55/222, 242, 261, 55/267, 428, 431, 466; 95/149, 154, 227, 228, 230, 237; 261/142; 422/168, 173

[56] References Cited

U.S. PATENT DOCUMENTS

| | | | |
|---|---|---|---|
| 1,117,309 | 11/1914 | Bentz | 55/242 |
| 4,469,493 | 9/1984 | Tuovinen et al. | 55/242 |
| 5,125,125 | 6/1992 | Barsacq | 55/242 |
| 5,147,421 | 9/1992 | Yung | 55/242 |
| 5,277,707 | 1/1994 | Munk et al. | 55/222 |
| 5,567,215 | 10/1996 | Bielawski et al. | 55/222 |
| 5,649,985 | 7/1997 | Imamura | 55/431 |

*Primary Examiner*—C. Scott Bushey
*Attorney, Agent, or Firm*—Rabin, Champagne, & Lynt, P.C.

[57] ABSTRACT

An apparatus for the removal of particles existing in exhaust gases by directly sprinkling the gases with water to congeal the particles. The apparatus also mixes surfactants into the water, and the mixture is driven by a pump to clean out the condensation deposited in a transmitting conduit in order to eliminate settled congealed particles that could block the transmitting conduit.

9 Claims, 2 Drawing Sheets

APPARATUS FOR TREATING PARTICLES

BACKGROUND OF THE INVENTION

1. Field of the Invention

The invention relates generally to an apparatus for treating particles and, particularly, to an apparatus for congealing particles existing in gases exhausted from a chemical vapor deposition (CVD) process reaction chamber, for integrated circuit fabrication, and for draining out the congealed condensation.

2. Description of the Related Art

CVD is defined as the formation of a non-volatile solid film on a substrate by the reaction of vapor phase chemicals (reactant gases) that contain the required constituents. The reactant gases are introduced into a reaction chamber and are decomposed and reacted on a heated surface to form the thin film. In the field of integrated circuit fabrication processes, CVD for forming thin films has become the major and important part of the process.

CVD systems are generally open-flow systems, in which gases continuously flow into the reaction chamber (where the deposition occurs), and gaseous by-products are exhausted together with unused reactant and diluent gases. Hazardous and poisonous gases with particles generated by reaction in the chamber are removed from the exhaust gas flow by a scrubber, and the remainder of the exhaust gas flow is vented to the atmosphere.

The conventional method for handling hazardous and poisonous gases containing particles is to add a heater on the end of the transmitting tube of the exhaust system to cause the gases flowing inside the tube to become hot. The method eliminates by reaction portions of poisonous constituents existing in the exhaust gas. Referring to FIG. 1, a conventional apparatus for treating particles in the exhaust gas is shown.

A chamber 10 for the CVD process vents poisonous gases with particles through a transmitting tube 20 that is connected to the chamber 10. The heater 30 causes the exhaust gases in the transmitting tube 10 to become hot to eliminate portions of poisonous constituents. Tap water tube 40 is spirally constructed around the transmitting tube 20. Tap water 42 is cyclically sent to the tap water tube 40 in order to cool gases in the tube 20 so as to congeal the particles in the gases and deposit condensation. The condensation is drained to a container 50 through an opening 22 in the tube 20. Then the condensation is drained away from the container 50 by a tube 52. The residual gases are exhausted out through another opening 24 in the tube 20.

In the conventional apparatus for treating particles, the condensation congealed from the exhaust gases becomes pieces of solid compound. The generated compound, however, can build up to the point of blocking the transmitting tube 20, thereby causing the exhaust system for the CVD chamber 10 to break down. Moreover, it can cause the exhaust system to explode. It is therefore threatening to the safety of people in the building where the fabrication is taking place. There is, therefore, a need for an apparatus that can congeal the particles in the exhaust gas and completely clean out the condensation generated during the congealing process.

SUMMARY OF THE INVENTION

It is, therefore, an object of the invention to provide an apparatus for congealing particles in exhaust gases by directly sprinkling tap water on the gases.

It is an another object of the invention to provide an apparatus for mixing surfactants into tap water that is driven by a high-pressure pump to clean out the condensation deposited in the transmitting tube in order to eliminate generated pieces of compound that would otherwise block the transmitting tube.

According to the invention, the foregoing objects are satisfied by a new and improved apparatus for treating particles. The apparatus is connected to a treating cabinet which receives exhaust gases containing particles from a heater. The apparatus receives tap water and surfactants from an external supply system. The apparatus includes a water pump, a first valve, a second valve, a first tube, a second tube, a third tube, a fourth tube, and a number of water sprinklers. The water pump is connected to the first valve and the external supply system by the first tube, and is connected to the water sprinklers by the second tube. The first valve is connected to the second tube and the second valve by the fourth tube. The second valve is connected to the external supply system by the third tube. A controller is coupled with the water pump and the first valve and second valve. The controller has two modes of operation, including a congealing mode and a clearing mode, and serves to set each of the first valve and the second valve in either an open or closed position, and sets the water pump to be either on or off.

The foregoing controller of the apparatus sets the first valve in the open mode and the second valve in the closed mode when the controller is in the congealing mode, whereby the water sprinklers spray the tap water in the treating cabinet to congeal the particles in the gases.

When the controller is in the clearing mode, it sets the second valve in the open mode and imports the surfactants through the fourth tube to mix with the tap water, and the mixed tap water is drained through the fourth tube and the water sprinklers to the treating cabinet. After a predetermined time, the controller actuates the water pump and closes the valves, whereby the mixed water washes the treating cabinet at high speed by the operation of the water pump.

BRIEF DESCRIPTION OF DRAWINGS

The invention will be more fully understood from the following detailed description of the preferred embodiment, with reference to the accompanying drawings, wherein.

DETAILED DESCRIPTION OF THE PREFERRED EMBODIMENT

Figure 1:
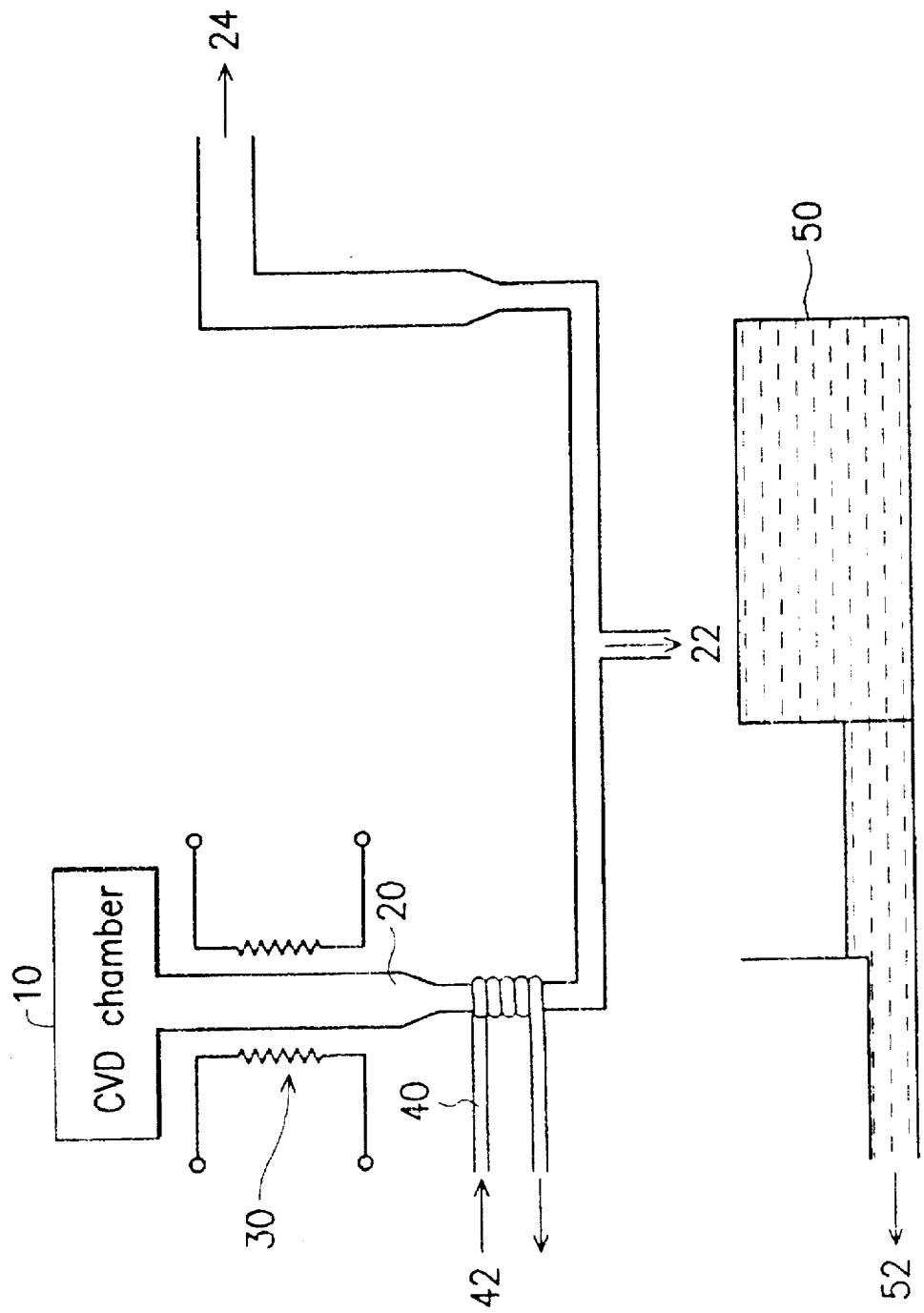
FIG. 1 is a schematic diagram of a conventional apparatus for treating particles in the exhaust gases of a CVD chamber.
Figure 2:
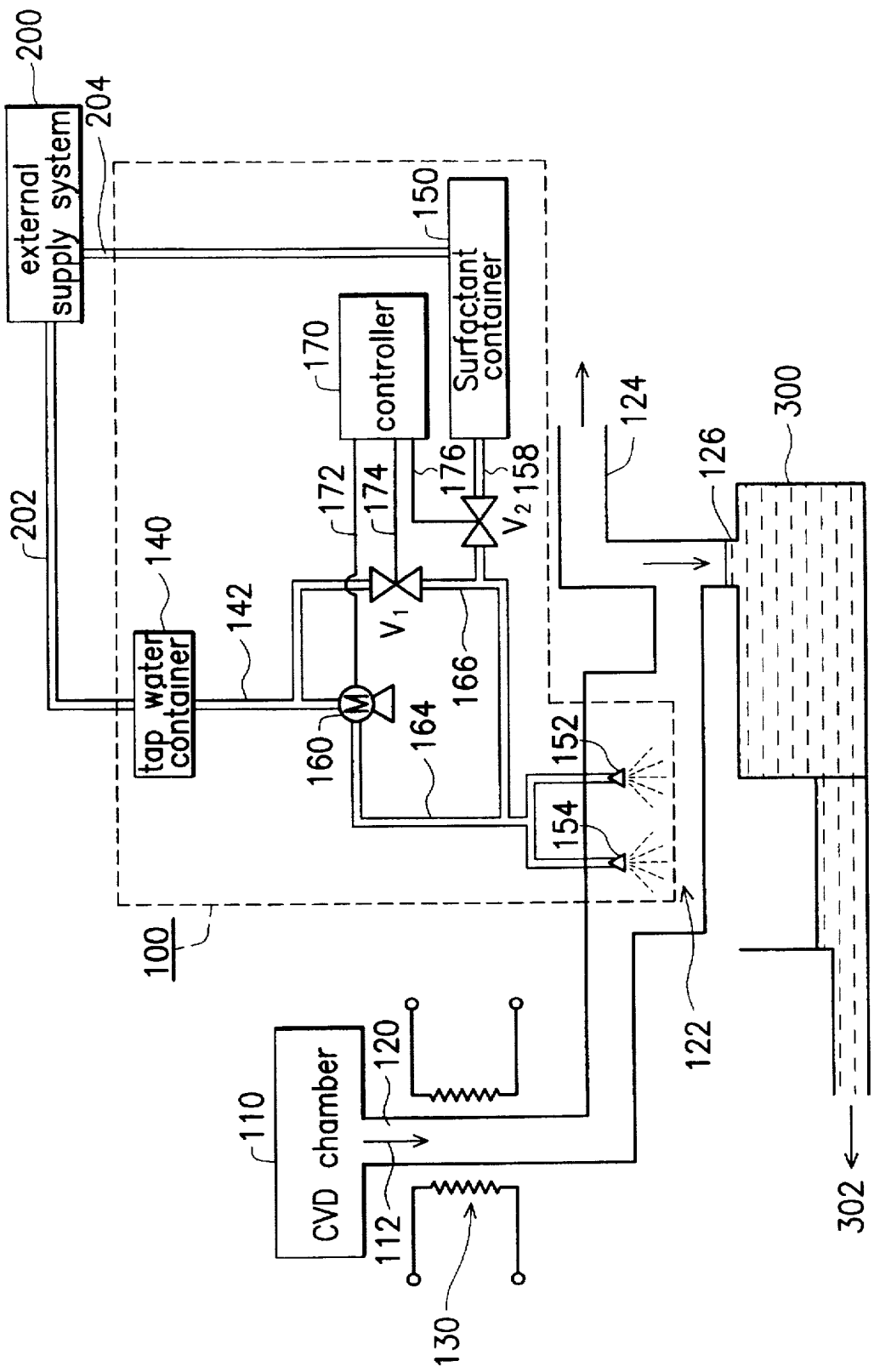
FIG. 2 is a schematic diagram of an apparatus according to the invention for treating particles in the exhaust gases of a CVD chamber.

Referring to FIG. 2, an apparatus 100 according to the invention treats particles in gases exhausted from the CVD chamber 110. An exhausting means, for example, a transmitting tube 120 is connected to the CVD chamber 110 to exhaust the gases 112 having particles generated by the CVD process. A heater 130 is disposed around the transmitting tube 120 to heat the exhaust gases in the tube 120 in order to eliminate portions which become poisonous constituents by reaction. The apparatus 100 for treating particles is connected to the tube 120 for receiving gases with particles from the CVD chamber 110, and is connected to an external supply system 200, by the tubes 202 and 204, for receiving tap water and surfactants from the external supply system 200. The apparatus 100 includes a water pump 160, control valves V1 and V2, tubing 142, tubing 164, tubing 166, a tube 158, and a plurality of water sprinklers 152 and 154, a tap water container 140, a surfactant container 150, and a controller 170.

The tap water container 140 is connected to the external supply system 200 through the tube 202 and contains tap water supplied by the external supply system 200. The surfactant container 150, connected to the external supply system 200 through the tube 204, contains surfactants supplied by the external supply system 200. The water pump 160 is connected to the tap water container 140 and valve V1 through the tubing 142, and is also connected to water sprinklers 152 and 154 through the tube 164. The valve V1 is connected to the tube 164 and the other valve V2 through the tubing 166. The valve V1 is also connected to the water sprinklers 152 and 154 through the tube 164 via the pump 160 and through tubing 166. The valve V2 is connected to the surfactants container 150 through the tube 158. The controller 170 is coupled to the water pump 160 and valves V1 and V2, and has two modes, including a congealing mode and a clearing mode, whereby the controller 170 controls valves V1 and V2 be open or closed, and also enables or disables the water pump 160.

The operation of the apparatus 100 for treating particles is described below: When the gases having particles 112 are exhausted from the CVD chamber 110 through transmitting tube 120, the heater 130 heats the exhaust gases 112 in the tube 120, in order to eliminate portions of poisonous constituents in the exhaust gases 112. Then the gases 112 are drawn to a treating cabinet 122 in the transmitting tube 120.

When the controller 170 is in the congealing mode, the apparatus 100 eliminates the particles existing in gases 112. The controller 170 opens the valve V1 and closes the valve V2 by control signals on lines 174 and 176, respectively. The tap water is drawn into the treating cabinet 112 by the operation of water sprinklers 152 and 154 through the tubing 142, and 166. The tap water congeals the particles existing in the gases 112, and the resulting condensation deposits on the bottom of the treating cabinet 122.

When the controller 170 is in the clearing mode, the apparatus 100 is able to eliminate the condensation deposited on the bottom of the treating cabinet 122. The controller 170 opens the valve V2 by a control signal on line 176, to drain the surfactant from surfactant container 150 through the tube 158. The drained surfactants are mixed with tap water, and then are carried to the treating cabinet 122 through tubing 166, tube 164, and water sprinklers 152 and 154, sequentially. After a predetermined time, twenty minutes for example, the controller 170 actuates the water pump 160 with the control signal on line 172 and closes the valves V1 at the same time. By the operation of the water pump 160, tap water mixed with surfactants washes the treating cabinet 122 at high speed to eliminate the condensation generated by the reaction of particles in the exhaust gases and tap water. Then resulting residue is drained to a container 300 through the opening 126 in the transmitting tube 120 and then out through the container opening 302.

In conclusion, the apparatus 100 according to the invention congeals particles existing in exhaust gases with tap water. After a predetermined time, tap water mixed with surfactants wash the treating cabinet 122 at a high speed by the operation of the water pump 160, to eliminate condensation deposited on the bottom of the transmitting tube 120. Thus, the generated compound does not block the transmitting tube 120, which would cause the evacuation system in the CVD chamber 110 to break down. Furthermore, the evacuation system will not explode due to a blocked evacuation system. With the apparatus of the invention, fabrication plants can exhaust waste gases smoothly, and also can avoid the threat of explosion of the evacuation system.

While the invention has been described by way of example and in terms of a preferred embodiment, it is to be understood that the invention is not limited to the disclosed embodiment. To the contrary, it is intended to cover various modifications and similar arrangements. Therefore, the scope of the appended claims should be accorded the broadest interpretation so as to encompass all such modifications and similar arrangements.

What is claimed is:

1. An apparatus for treating particles in a heated exhaust gas with water and surfactant to remove the particles from the exhaust gas, the apparatus including:

pump means for pumping the water;

a water sprinkler for spraying the exhaust gas;

first valve means and second valve means;

a controller for opening and closing the first and second valve means and for turning the pump means on and off;

first conduit means for carrying water from a source of water and surfactant to the first valve means and the pump means;

second conduit means for providing fluid communication between the pump means and the sprinkler;

third conduit means for providing fluid communication between the source of water and surfactant and the second valve means; and fourth conduit means, in fluid communication with the first valve means and the second valve means, for carrying the water from the first conduit means to the sprinkler when the first valve means is open and for carrying surfactant from the third conduit means to the sprinkler when the second valve means is open.

2. An apparatus as claimed in claim 1, wherein the water sprinkler includes means for sprinkling the heated exhaust gas in a treating cabinet.

3. An apparatus as claimed in claim 2, wherein the controller has a congealing mode during which the controller opens the first valve means and closes the second valve means to allow water to flow from the first conduit means to the water sprinkler to sprinkle the heated exhaust gas and congeal the particles in the gases.

4. An apparatus as claimed in claim 2, wherein the controller has a clearing mode during which the controller opens the first valve means and second valve means so that the surfactant is carried from the third conduit means to mix with the water in the fourth conduit means, and the mixed water and surfactant are drained through the fourth conduit means to the water sprinkler, and thereafter, following a predetermined time period, the controller turns on the pumping means, whereby the mixed water and surfactant wash the treating cabinet at high speed by the operation of the pumping means.

5. An apparatus as claimed in claim 1, wherein the water sprinkler includes means for sprinkling the heated exhaust gas in a treating cabinet, the controller has a congealing mode during which the controller opens the first valve means and closes the second valve means to allow water to flow from the first conduit means to the water sprinkler to sprinkle the heated exhaust gas and congeal the particles in the gas, and the controller has a clearing mode, during which the controller opens the first valve means and second valve means so that the surfactant is carried from the third conduit means to mix with the water in the fourth conduit means, and the mixed water and surfactant are drained through the fourth conduit means to the water sprinkler, and thereafter, following a predetermined time period, the controller turns on the pumping means, whereby the mixed water and surfactant wash the treating cabinet at high speed by the operation of the pumping means.

6. An apparatus for treating particles in a heated exhaust gas with water and surfactant to remove the particles from the exhaust gas, the apparatus including:

a water container for receiving and holding the water from an external supply system;

a surfactant container for receiving and holding the surfactant from the external supply system;

pump means, in fluid communication with the water container, for pumping water;

a water sprinkler, for spraying the exhaust gas in a treating cabinet;

first valve means and second valve means;

a controller for opening and closing the first and second valve means and for turning the pump means on and off;

first conduit means for carrying water from the water container to the first valve means and the pump means;

second conduit means for providing fluid communication between the pump means and the sprinkler;

third conduit means for providing fluid communication between the surfactant container and the second valve means; and fourth conduit means, in fluid communication with the first valve means and the second valve means, for carrying the water from the first conduit means to the sprinkler when the first valve means is open and for carrying surfactant from the third conduit means to the sprinkler when the second valve means is open.

7. An apparatus as claimed in claim 6, wherein the controller has a congealing mode during which the controller opens the first valve means and closes the second valve means to allow water to flow from the first conduit means to the water sprinkler to sprinkle the heated exhaust gas and congeal the particles in the gas.

8. An apparatus as claimed in claim 6, wherein the controller has a clearing mode during which the controller opens the first valve means and second valve means so that the surfactant is carried from the surfactant container through the third conduit means to mix with the water in the fourth conduit means, and the mixed water and surfactant are carried through the fourth conduit means to the water sprinkler and sprinkled in the treating cabinet, and thereafter, following a predetermined time period, the controller turns on the pumping means, whereby the mixed water and surfactant wash the treating cabinet at high speed by the operation of the pumping means.

9. An apparatus as claimed in claim 6, wherein the water sprinkler includes means for sprinkling the heated exhaust gas in the treating cabinet, the controller has a congealing mode during which the controller opens the first valve means and closes the second valve means to allow water to flow from the water container to the water sprinkler through the first conduit means and the fourth conduit means, to sprinkle the heated exhaust gas and congeal the particles in the gas, and the controller has a clearing mode, during which the controller opens the first valve means and second valve means so that the surfactant is carried from the surfactant container through the third conduit means to mix with the water in the fourth conduit means, and the mixed water and surfactant are carried through the fourth conduit means to the water sprinkler, and thereafter, following a predetermined time period, the controller turns on the pumping means, whereby the mixed water and surfactant wash the treating cabinet at high speed by the operation of the pumping means.

* * * * *